United States Patent [19]

Norton

[11] Patent Number: 4,564,070

[45] Date of Patent: Jan. 14, 1986

[54] HYDROCARBON RECOVERY PROCESS USING AN IN SITU SILICATE/POLYMER GEL

[75] Inventor: Charles J. Norton, Denver, Colo.

[73] Assignee: Marathon Oil Company, Findlay, Ohio

[21] Appl. No.: 554,875

[22] Filed: Nov. 25, 1983

Related U.S. Application Data

[63] Continuation-in-part of Ser. No. 337,638, Jan. 7, 1982, abandoned.

[51] Int. Cl.⁴ .................... E02D 3/12; E21B 33/138
[52] U.S. Cl. .................................. 166/295; 166/300; 405/264; 523/130; 523/132
[58] Field of Search ............... 166/270, 273, 274, 275, 166/294, 295, 308; 252/8.55 R, 8.55 D; 526/303.1; 523/130, 131, 132; 405/264

[56] References Cited

U.S. PATENT DOCUMENTS

| | | | |
|---|---|---|---|
| 2,842,338 | 7/1958 | Davis et al. | 166/305 R X |
| 3,056,757 | 10/1962 | Rakowitz | 260/29.6 |
| 3,247,900 | 4/1966 | Perry et al. | 166/295 |
| 3,354,084 | 11/1967 | Katzer | 252/2 |
| 3,370,649 | 2/1968 | Wolgemuth | 166/274 |
| 3,421,584 | 1/1969 | Eilers et al. | 166/295 |
| 3,749,172 | 7/1973 | Hessert et al. | 166/274 |
| 3,825,067 | 7/1974 | Vestal | 166/274 X |
| 4,031,958 | 6/1977 | Sandiford et al. | 166/270 |
| 4,199,625 | 4/1980 | Pilny et al. | 166/295 X |
| 4,326,970 | 4/1982 | Cottrell et al. | 166/275 X |
| 4,343,363 | 8/1982 | Norton et al. | 166/295 X |
| 4,401,789 | 8/1983 | Gideon | 166/275 X |
| 4,413,680 | 11/1983 | Sandiford et al. | 166/295 X |
| 4,461,352 | 7/1984 | Falk | 166/295 |
| 4,494,606 | 1/1985 | Sydansk | 166/295 |
| 4,503,909 | 3/1985 | Argabright et al. | 166/252 |
| 4,503,912 | 3/1985 | Norton | 166/295 |

OTHER PUBLICATIONS

Merrill, R. C., et al., *J. Phys. Coll. Chem.*, vol. 54, pp. 806–812.

*Primary Examiner*—George A. Suchfield
*Attorney, Agent, or Firm*—Jack L. Hummel; Rodney F. Brown

[57] ABSTRACT

A process for producing a silicate/polymer gel in situ by reacting an undried, water-soluble, partially hydrolyzed polyacrylamide, a water-soluble silicate and a gelling agent in a porous earthen matrix, such as a subterranean hydrocarbon-bearing formation, to improve hydrocarbon recovery from the formation.

16 Claims, No Drawings

HYDROCARBON RECOVERY PROCESS USING AN IN SITU SILICATE/POLYMER GEL

CROSS REFERENCE TO RELATED APPLICATIONS

This a continuation-in-part application of the U.S. patent application, Ser. No. 337,638, filed on Jan. 7, 1982, now abandoned.

TECHNICAL FIELD

The invention relates to a process for producing a silicate/polymer gel in situ to improve the recovery of hydrocarbons from a subterranean formation or to stabilize unconsolidated earth. More particularly, the process comprises injecting the gel components, an undried partially hydrolyzed polyacrylamide, a water-soluble silicate and a gelling agent, into a subterranean formation or a soil and reacting the components in situ to form a silicate/polymer gel.

BACKGROUND ART

The production of gels from water-soluble silicates and acid gelling agents is well known in the art. See Merrill, R. C. et al, *The Journal of Physical and Colloidal Chemistry*, Vol. 54, p. 806–812 (June 1954); Wills, J. H., "Synthetic Inorganic Silicates", *Encyclopedia of Chemical Technology*, Vol. 18, 2nd Ed. (1969), John Wiley and Sons, Inc.; and Vail, J. G., "Soluble Silicates, Their Properties and Uses", *Vol. 1: Chemistry*, Rheinhold Publishing Corp.

The formation of gels from water-soluble polymers is equally well known. U.S. Pat. No. 2,842,338 to Davis et al mixes monomeric calcium acrylate with soil and polymerizes the monomer by cross-linking the acrylic acid groups with the calcium ions to consolidate the soil. U.S. Pat. No. 3,056,757 to Rakowitz gels an acrylamide and methylene-bis-acrylamide mixture using water-soluble salts, such as calcium, aluminum and chromium chlorides, as gelling agents. U.S. Pat. No. 3,421,584 to Eilers et al gels an aqueous system containing water-soluble polymer particles and sodium silicate at a low pH using a gelling agent as a hydrogen ion source. U.S. Pat. No. 3,247,900 to Perry et al polymerizes a monomer in the presence of silica and fluoride ions. U.S. Pat. No. 3,354,084 to Katzer produces a gel from a system containing water, polyacrylamide and silica gel in a finely divided solid form. U.S. Pat. No. 3,749,172 to Hessert et al prepares an aqueous gel from a mixture containing brine, polyacrylamide and amorphous silica.

U.S. Pat. No. 4,031,958 to Sandiford et al extends the above-cited art by combining a partially hydrolyzed polyacrylamide with a gelling agent and sequentially injecting the mixture into a subterranean formation. The polyacrylamide slug is followed by the injection of an alkali metal silicate slug, which contacts the polyacrylamide to form an in situ gel.

The above-cited references describe a number of processes for producing polymer and/or silicate gels. However, the success of these processes for subterranean applications is unpredictable because it is difficult to adequately control the in situ gelation reaction. Gelation reactions are very sensitive to the particular properties and concentrations of the gel components and require good mixing in a favorable environment. If the reaction cannot be controlled at optimum values of these parameters, no gel or, at best, a weak gel is produced and the process fails its intended function for lack of a stable gel.

The problem not solved in the prior art is that of identifying the reaction parameters to which the gelation reaction is most sensitive and controlling these parameters. A process is needed to produce a gel sufficiently stable for subterranean applications such as improved oil recovery or soil consolidation. A process is needed whereby the gel components are uniformly mixed and applied to a porous earthen matrix, such as a subterranean hydrocarbon-bearing formation or unconsolidated soil to produce a homogeneous gel in situ.

DISCLOSURE OF THE INVENTION

According to this invention, a silicate/polymer gel is formulated by adding a water-soluble silicate to an aqueous solution of an undried, water-soluble partially hydrolyzed polyacrylamide (PHPA). A gelling agent is added to this mixture which is a water-soluble composition capable of cross-linking the silicate and PHPA to form a gel network. The gel-forming components can be completely mixed at the surface before they are injected into an earthen treatment zone. Gelation is delayed until after injection by such means as sequestering or microencapsulating the gelling agent or maintaining a high pH of the gel-forming mixture. Alternatively, the components can be injected sequentially into the formation relying on in situ mixing to effect gelation.

Important gelation reaction parameters include the concentration of the gel components in the reaction mixture, the activity of the gelling agent, the sequence of mixing the gel components and the pH of the reaction mixture. The rate of the gelation reaction and the consistency of the resulting gel are controlled by varying these parameters. For example, reducing the pH of the mixture increases the reaction rate and increasing the concentration of silicate produces a more rigid gel.

The values of the reaction parameters are predetermined to produce an optimum gel for a given subterranean application. As such, the process is extremely adaptable to different applications and formation conditions. Subterranean hydrocarbon recovery related applications of the process include face and fracture plugging, mobility reduction and permeability reduction to improve secondary or tertiary hydrocarbon recovery operations. The process also has non-oil field applications such as soil consolidation.

The instant invention is an improvement over prior hydrocarbon recovery processes because it utilizes a more effective gel. Unlike the gels used in prior art processes, the gel of this invention is produced from a polymer which has not been dried to gelation. The polymer is maintained in an aqueous solution from the time it is produced until it is gelled. A gel produced from an undried polymer has heretofore unrecognized advantages over gels produced from dried polymer in hydrocarbon recovery applications.

BEST MODE FOR CARRYING OUT THE INVENTION

The invention is a process for improving hydrocarbon recovery from a subterranean formation or stabilizing unconsolidated earth. A gel-forming mixture is applied to a porous earthen matrix where the mixture gels in situ. The mixture is comprised of a polymer, a silicate and a gelling agent. The polymer is a water-soluble, undried or substantially undried, partially hydrolyzed polyacrylamide (PHPA).

As used herein, the term "undried or substantially undried" refers to the state of the PHPA. When an aqueous monomer is solution polymerized, the polymer product remains dissolved in the aqueous reaction medium. Thereafter the polymer can be isolated from the aqueous medium and dried. This "dried" polymer is essentially water-free, solid particles, which can be redissolved in an aqueous medium. Conversely, PHPA which is retained in the aqueous medium after it is polymerized without subsequent isolating and drying is "undried or substantially undried" PHPA. It is an aqueous polymer solution. The pH of the undried PHPA is generally very alkaline, i.e., above 11. The undried PHPA is used directly as a starting material of the silicate/polymer gel.

The PHPA has up to about 75% of the carboxamide groups hydrolyzed to carboxylate groups. Preferably 25 to 35% of the carboxamide groups are hydrolyzed to carboxylate groups. The term, "hydrolyzed", as used herein, encompasses polymers wherein the carboxylate groups are in an acid or salt form such as ammonium salts, alkali metal salts and other salts which are substantially water soluble. The PHPA is water soluble and has a molecular weight from about 250,000 to about 10 million and preferably from about 1 million to about 5 million. The PHPA concentration in the gel-forming mixture is within a range of from about 0.1 to about 10% by weight, preferably from about 0.25 to about 7.5% by weight and more preferably from about 1.0 to about 5% by weight.

The silicate is water soluble and preferably an alkai metal, ammonium or aluminum silicate. The silicate concentration in the mixture is from about 0.1 to about 10% by weight, preferably 0.25 to about 5% by weight and more preferably from about 0.5 to about 5% by weight.

The gelling agent added to the mixture is water soluble and preferably a lower alkyl carboxylate, strong acid, or salt of a strong acid. Preferred lower alkyl carboxylates include propyl acetate, ethyl acetate and ethyl propionate. Preferred strong acids include sulfuric, hydrochloric, ascorbic, and formic acid while preferred salts include ammonium sulfate, sodium ascorbate, aluminum sulfate and zinc chloride. The amount of gelling agent used is consonant with the particular application for the process, the character of the soil or geologic formation being treated, the molecular weight and physical configuration of the PHPA, and the desired gelation rate. Generally the amount of gelling agent added to the reaction mixture is an amount sufficient to reduce the pH of the mixture to below about 11 and preferably below about 9 to about 7.

The medium used in the aqueous mixture can be water of any quality including saline, brackish or hard water. However, fresh or deionized water is preferred.

The order of mixing the gel components is an important parameter determining the consistency of the resulting gel. To produce a firm gel, the water-soluble silicate is preferably added first to the aqueous undried PHPA. After they are mixed, the gelling agent is added to the aqueous mixture either as an aqueous solution or in a solid form. The mixture is then injected into the formation. Gelation occurs in situ after the gel-forming mixture is in place in the desired treatment zone.

An alternative method for producing an in situ gel is to inject the gel components into a formation in sequential slugs, injecting a slug containing an undried PHPA and a water-soluble silicate followed by an aqueous slug containing a gelling agent. It is essential that good in situ mixing occurs between the gelling agent and the other two gel components to effect gelation in the treatment zone.

In one desires to produce a fluid gel for a temporary seal of a fracture zone, the gelling agent is first mixed in a solution with either the silicate or PHPA. The remaining component is added thereafter.

As noted above, the properties of the gel and the gelation rate are a strong function of the values of the reaction parameters. Values of the parameters are varied depending on the desired application of the gel. For example, if the object of the process is permeability reduction a substantial distance from the wellbore, the concentrations of gelling agent and silicate are reduced and the pH of the mixture is maintained at a high value. This produces a fluid, mobile gel more suitable for permeability reduction. Where a firm gel is desired for face plugging, the silicate and gelling agent concentrations are increased.

The following examples are illustrative of applications of the present invention and are not to be construed as limiting the scope thereof.

EXAMPLES 1-5

Several gels are produced by combining varying concentrations of gel components in individual sample jars. Qualitative observations are recorded of gel characteristics as a function of time at a fixed temperature. $SiO_2$ is combined with an undried PHPA. Ethyl acetate is then added to initiate gelation. At Time=0, the instant the ethyl acetate gelling agent is added to the mixture, a slightly cloudy suspension containing bubbles forms. Thereafter the change in appearance of the contents of each sample jar is noted over time. Each vertical column in the Tables of Examples 1-5 represents a different gel-forming mixture in a sample jar.

EXAMPLE 1

Gel Volume: 50 ml
Concentration (by Weight)
$SiO_2$: 2%
PHPA: 1%
Temperature: 51° C.

| Time (Min) | Ethyl Acetate Added (ml) | | | |
|---|---|---|---|---|
| | 2.0 | 1.5 | 1.0 | 0.5 |
| 10 | slightly cloudy | slightly cloudy | cloudy | clear |
| 30 | firm gel | thick | very cloudy | clear |
| 40 | | firm gel | thick | slightly cloudy |
| 50 | | | very thick | cloudy w/ slight precipitate |
| 58 | | | firm gel | cloudy w/ precipitate |
| 90 | | | | very cloudy |
| 105 | | | | thick |
| 1350 | | | | thick, no firm gel |

EXAMPLE 2

Gel Volume: 50 ml
Concentration (by Weight)
$SiO_2$: 2%
PHPA: 0.5%
Temperature: 50° C.

| Time (Min) | Ethyl Acetate Added (ml) | | | |
|---|---|---|---|---|
| | 2.5 | 2.0 | 1.5 | 1.0 |
| 15 | cloudy | slightly cloudy | very slightly cloudy | nearly clear |
| 30 | firm gel | firm gel | thick | precipitate streamer |
| 35 | | | firm gel | cloudy w/ precipitate |
| 36 | | | | very cloudy |
| 70 | | | | firm gel |

EXAMPLE 3

Gel Volume: 50 ml
Concentration (by Weight)
$SiO_2$: 2%
PHPA: 1%
Temperature: 50.5° C.

| Time (Min) | Ethyl Acetate Added (ml) | | | | | |
|---|---|---|---|---|---|---|
| | 1.2 | 1.0 | 0.9 | 0.8 | 0.7 | 0.6 |
| 39 | cloudy | no change | no change | no change | no change | no change |
| 53 | firm gel | very cloudy | cloudy | slightly cloudy | no change | no change |
| 68 | | thick | very cloudy | slightly cloudy | slightly cloudy | slightly cloudy |
| 83 | | firm gel | thick | slightly cloudy | slightly cloudy | slightly cloudy |
| 98 | | | thick | very cloudy | slightly cloudy | slightly cloudy |
| 113 | | | firm gel | very cloudy | slightly cloudy | slightly cloudy |
| 173 | | | | thick | very cloudy | slightly cloudy |

EXAMPLE 4

Gel Volume: 25 ml
Concentration (by Weight)
$SiO_2$: 2%
PHPA: 0.5%
Temperature: 50.5° C.

| Time (Min) | Ethyl Acetate Added (ml) | |
|---|---|---|
| | 0.45 | 0.40 |
| 210 | very thick | very cloudy |
| <1320 | firm gel | very thick |

EXAMPLE 5

Weight % PHPA: 0.5%
Volume $SiO_2$: 0.45 ml

| Time (Min) | $SiO_2$ (wt. %) | | |
|---|---|---|---|
| | 2.0 | 1.5 | 1.0 |
| 135 | very thick | very cloudy | very cloudy |
| 240 | firm gel | very thick | very cloudy |
| 300 | | firm gel | very cloudy |
| 360 | | | very thick |

It is apparent from Examples 1-5 that the gelation rate and gel consistency are strongly dependent on the concentration of the reactants. Increasing the concentration of $SiO_2$, PHPA or ethyl acetate within a given range increases the reaction rate and produces a firmer gel. Conversely, reducing the concentration of one or more of these components produces a more mobile fluid gel.

EXAMPLE 6

The table below shows gelation time as a function of $SiO_2$ and isopropyl acetate concentration. The concentration of undried PHPA is constant at 0.5 wt.% in every run. Each entry in the vertical columns of the table below the $SiO_2$ concentrations represents a gel formulation at a different concentration of $SiO_2$ and isopropyl acetate. The value of the entry is the time elapsed in hours before the gel-forming mixture becomes cloudy. The gelation rate is more rapid at higher concentrations of the isopropyl acetate gelling agent. However, increasing the concentration of $SiO_2$ above 2% does not appreciably increase the gelation rate.

$SiO_2$ and Isopropyl Acetate Concentration v. Gelation Time (Hrs)
Weight % Undried PHPA: 0.5%

| Weight % Isopropyl Acetate | Weight % $SiO_2$ | | | |
|---|---|---|---|---|
| | 2 | 3 | 4 | 5 |
| 1.8 | 10.00 | 4.25 | | |
| 2.0 | 10.00 | 4.25 | | |
| 2.2 | 4.50 | 3.50 | | |
| 2.4 | 4.00 | 3.25 | | |
| 2.6 | 3.25 | 3.25 | | |
| 2.8 | 3.25 | 3.25 | | |
| 3.0 | 2.50 | 2.75 | | |
| 3.5 | 1.75 | 2.50 | 2.00 | 3.50 |
| 4.0 | 2.25 | 2.00 | 2.00 | 3.50 |

EXAMPLE 7

Sand from the Tensleep Formation is packed wet in a holder 5.1 cm in diameter and 15 cm long. The permeability of the sandpack is 130.7 md at residual oil.

The sandpack is then subjected to several sequential treatments of a PHPA/$SiO_2$ slug, a water slug and an $(NH_4)_2SO_4$ slug. About one pore volume of a 5000 ppm PHPA solution containing 1% $SiO_2$ is injected at a rate of 4.65 ml/min. A 5 ml spacer of synthetic Tensleep water is followed with 2.5 g of $(NH_4)_2SO_4$ dissolved in 5 ml water. The $(NH_4)_2SO_4$ slug is sufficient to gel all the PHPA/$SiO_2$ in place. Another 5 ml spacer is injected to flush the lines followed by 0.5 PV of a second PHPA/$SiO_2$ slug. The core is shut in and maintained overnight at 50° C. Tensleep water is injected the following morning with only a slight change in permeability.

The sandpack is then treated with several alternating 5 ml slugs of PHPA/$SiO_2$, water and $(NH_4)_2SO_4$. The PHPA/$SiO_2$ concentrations are the same as above, but the $(NH_4)_2SO_4$ is a 25% solution. One pore volume of alternating 5 ml slugs are repeatedly injected in the following sequence: PHPA/$SiO_2$, water, $(NH_4)_2SO_4$, water. This sequence appears somewhat effective in reducing permeability; however, good mixing does not seem to take place.

The sequence is repeated with one more pore volume of fluids using the same concentrations, but the water slug is reduced to 1 ml. There is no dramatic pressure build-up.

Finally the water spacer is eliminated from the injection sequence entirely. One pore volume of sequential PHPA/SiO$_2$ and (NH$_4$)$_2$SO$_4$ slugs without the spacer is injected and allowed to stand overnight. The permeability is calculated after 1.6 PV of post-treatment water is injected through the sandpack. The final sequence produces a dramatic increase in injection pressure, but does not produce a significant change in the internal pressure drop.

The silicate/polymer gel treatment penetration is about 2.5 cm as determined by dismantling and examining the sandpack. Considerable gel buildup occurs at the sand face, with some additional extension along the edges of the holder. The sand at the exit end is unconsolidated, crumbles and is easily separated.

EXAMPLE 8

Ten gel component mixtures of varying concentration and mixing sequence are reacted in sample jars for four hours at 25° C. Qualitative observations of the resulting gels are noted in the table below. The silicate used in all runs is a sodium silicate containing 28.7% silicate by weight. The undried PHPA is diluted with deionized water. In runs 1–4, the sodium silicate is added to the PHPA solution first and then the ammonium sulfate gelling agent is added. In runs 5–10, the gelling agent is dissolved in the PHPA solution before the silicate is added.

The results indicate that a much stronger gel is produced when the silicate and PHPA solution are combined prior to adding the gelling agent. By comparison between Runs 1 and 2, the presence of PHPA in the gel prevents syneresis, shrinkage and fracturing of the gel. The PHPA-containing gel adheres well to the glass container walls. The gelation rate is sensitive to the concentration of gelling agent. Gelation is much more rapid at higher concentrations of gelling agent.

| Run No. | Gel Components SiO$_2$ wt. % | PHPA wt. % | (NH$_4$)$_2$SO$_4$ | Qualitative Observation |
|---|---|---|---|---|
| Runs 1–4, Silicate & PHPA Solution Mixed Before Ammonium Sulfate Addition | | | | |
| 1 | 2 | None | 2.5 g (added dry) | Instant translucent gel aggregates; stays firm for about 24 hours, then syneresis & shrinkage w/fractures occur; does not adhere well to glass. |
| 2 | 2 | 1 | 2.5 g (added dry) | Instant opaque firm, white, stable gel, w/o syneresis; adheres to wall w/o fractures on inversion. |
| 3 | 1 | 0.5 | 1.25 g (added dry) | Semi-opaque, white semi-fluid gel; does not set firm to walls |
| 4 | 2 | 1 | 2.5 g (added in 4 ml of deionized water). | Instant, firm, opaque, white gel; adheres to walls when inverted w/o syneresis. |
| Runs 5–10, Ammonium Sulfate Predissolved in PHPA Solution Before Silicate Addition | | | | |
| 5 | 1 | 0.5 | 1.25 g | Weak gel forms slushy suspension w/syneresis. |
| 6 | 3 | 1 | 2.5 g | Weak gel, no aqueous phase. |
| 7 | 3 | 0.5 | 2.5 g | Weak gel, separates into aqueous phase and silica precipitate. |
| 8 | 1 | 0.5 | 2.5 g | Semi-fluid translucent gel. |
| 9 | 0.5 | 0.5 | 2.5 g | Fluid translucent gel. |
| 10 | 0.25 | 0.5 | 2.5 g | Fluid translucent gel. |

EXAMPLE 9

4 ml of 28.7 wt.% sodium silicate having an SiO$_2$/Na$_2$O wt. ratio of 3.22 are dissolved in 46 ml of deionized water in a glass jar to produce a clear 2% SiO$_2$ solution. 2.5 g of ammonium sulfate are added to the solution resulting in an SiO$_2$:(NH$_4$)$_2$SO$_4$ mole ratio of about 1:1. A firm but friable translucent gel forms immediately in the jar. After aging for 24 hours, the gel exhibits syneresis and shrinkage so that it does not adhere well to the jar when inverted.

EXAMPLE 10

4 ml of the 28.7 wt.% sodium silicate of Example 9 is dissolved in 46 ml of a 1 wt.% PHPA solution in deionized water. The PHPA is water soluble, undried and approximately 30% hydrolyzed. 2.5 g of ammonium sulfate are added to the clear solution in the jar. The mixture is shaken, immediately producing a thick, semi-stringy, opaque white, firm gel which adheres to the bottom of the inverted jar. The gel is stable for a long period of time without shrinkage, phase separation or syneresis.

While the foregoing preferred embodiment of the invention has been described and shown, it is understood that other alternatives and modifications, such as those suggested and others may be made thereto and follow in the scope of the invention.

What is claimed is:

1. A process for treating a porous earthen matrix with a silicate/polymer gel comprising the steps of:
    injecting into said matrix an undried, water-soluble, partially hydrolyzed polyacrylamide, a water-soluble silicate and a gelling agent selected from the group consisting of water-soluble strong acids and water-soluble salts of strong acids; and
    reacting a mixture of said partially hydrolyzed polyacrylamide, silicate and gelling agent in said matrix to form said silicate/polymer gel in situ.

2. The process of claim 1 wherein the partially hydrolyzed polyacrylamide and silicate are mixed in a first aqueous slug, said gelling agent is added to a second aqueous slug, said first and second aqueous slugs are sequentially injected into said matrix, and said first and second aqueous slugs from said mixture in situ.

3. The process of claim 2 wherein the pH of said first slug is above about 9.

4. The process of claim 3 wherein said gelling agent is said water-soluble strong acid, present in an amount sufficient to reduce the pH of said first slug below about 9.

5. The process of claim 2 wherein said first slug is separated from said second slug by an aqueous spacer.

6. The process of claim 1 wherein said partially hydrolyzed polyacrylamide, silicate and gelling agent are added to a single aqueous slug to form said mixture and injected into said matrix.

7. The process of claim 1 wherein said salt of a strong acid is selected from the group consisting of ammonium sulfate, sodium ascorbate, aluminum sulfate and zinc chloride.

8. The process of claim 1 wherein said strong acid is selected from the group consisting of sulfuric, hydrochloric, ascorbic and formic acids.

9. The process of claim 1 wherein said water-soluble silicate is selected from the group consisting of alkali metal, ammonium, and aluminum silicates.

10. The process of claim 1 wherein the concentration of said undried partially hydrolyzed polyacrylamide in said reaction mixture is from about 0.1 to about 10% by weight.

11. The process of claim 1 wherein the molecular weight of said undried partially hydrolyzed polyacrylamide is from about 250,000 to about 10 million.

12. The process of claim 1 wherein the concentration of said water-soluble silicate in the mixture is from about 0.1 to about 10% by weight.

13. The process of claim 1 wherein said gelling agent is present in said mixture in an amount sufficient to produce a gel of a desired consistency and gelation rate.

14. The process of claim 1 wherein said porous earthen matrix is a subterranean hydrocarbon-bearing formation.

15. The process of claim 14 wherein said mixture is injected into said formation via a well.

16. The process of claim 1 wherein said porous earthen matrix is an unconsolidated soil.

* * * * *